United States Patent [19]

Ono et al.

[11] Patent Number: 4,737,860
[45] Date of Patent: Apr. 12, 1988

[54] IMAGE RECORDING APPARATUS

[75] Inventors: Takeshi Ono, Yokohama; Shigeki Ohno, Chigasaki, both of Japan

[73] Assignee: Canon Kabushiki Kaisha, Tokyo, Japan

[21] Appl. No.: 807,313

[22] Filed: Dec. 10, 1985

[30] Foreign Application Priority Data

Dec. 13, 1984 [JP] Japan ................................. 59-261851
Jan. 31, 1985 [JP] Japan ................................. 60-15464

[51] Int. Cl.⁴ ................................................ G01D 5/10
[52] U.S. Cl. ................................. 358/298; 346/76 PH
[58] Field of Search ........................... 346/1.1, 76 PH; 358/296, 298; 400/120

[56] References Cited

U.S. PATENT DOCUMENTS

| | | | |
|---|---|---|---|
| 4,368,491 | 1/1983 | Saito | 358/298 X |
| 4,415,907 | 11/1983 | Suemori | 346/76 PH |
| 4,494,126 | 1/1985 | Todoh | 358/298 X |
| 4,532,523 | 7/1985 | Tanaka | 358/298 X |
| 4,564,847 | 1/1986 | Hayashi et al. | 346/76 PH |
| 4,590,487 | 5/1986 | Nozuchi et al. | 346/76 PH |

Primary Examiner—Clifford C. Shaw
Attorney, Agent, or Firm—Fitzpatrick, Cella, Harper & Scinto

[57] ABSTRACT

There is an image recording apparatus using a thermal head for use in a facsimile apparatus or the like. This recording apparatus comprises: an input device to input a plurality of kinds of image data; a discriminating device to determine the kind of image which is inputted to the input device; a thermal head as a recording device to reproduce the image inputted to the input device; and a control unit to variably control the energy which is supplied to the thermal head in order to make constant the recording density of the thermal head in accordance with the kind of input image data. When the input image is a half tone image, the control unit increases the supply energy to the thermal head as compared with the case of a simple binary image. When the resolution of the input image is high, the control unit reduces the supply energy to the thermal head than that when the resolution is low. The supply energy is reduced in the case of a copy image than that in the case of a received image. With this apparatus, characters, image, or the like can be always recorded at a constant recording density irrespective of the kind of image or the operating mode of the apparatus.

17 Claims, 6 Drawing Sheets

Fig. 3A
PRINT START

1: COPY OR
0: COMMUNICATION
1: CONVENTIONAL OR
0: HALF TONE

Fig. 3B
PRINT

Fig. 3C
STOP

IMAGE RECORDING APPARATUS

BACKGROUND OF THE INVENTION

1. Field of the Invention

The present invention relates to an image recording apparatus in a facsimile communicating apparatus or the like and, more particularly, to an image recording apparatus using thermal recording means.

2. Description of the Prior Art

Hitherto, in such apparatuses, a temperature detecting device such as a thermo-couple, a thermistor, or the like is attached at a proper position of a thermal head in order to keep a temperature of a heating element constant, and energy which is applied to the heating element is changed on the basis of the temperature data measured. However, the temperature of the heating element is not constant due to various factors and a density difference occurs in the reproduced image depending on the mode thereof. One of those factors which is particularly significant is based on the point that the recording period of a line varies depending on the mode of the image to be reproduced.

For example, when considering the cases of the received image and the reproduced image resulting from copying operation, in the case of the received image, in general, it takes some time to decode the MH (Modified Huffman) code or MR (Modified Read) code or to convert the RL (Run. Length) code to original code in accordance with the equipment, or the like. Further, in the case of the received image, because of the limitations of transmission rate and transmission time itself, as the pattern of the image is complicated, the recording time of each line becomes so long as to exceed the capability of the shortest recording time which the recording apparatus has and it takes a long time until the heating element gets cool, so that its temperature does not decrease.

On the other hand, in the case of the copying operation, there is no need for decoding or to convert the data; therefore, the recording apparatus performs the recording in the shortest recording time. This results in an increase of the temperature of the heating element due to a heat regenerative effect thereof and there is a drawback such that the reproduced image becomes thicker than the reproduced image upon reception. Due to this, if an energy is applied to the heating element preliminarily in accordance with the copying operation, the reproduced image upon reception will have become thinner than expected. At this time, it is preferable to instantaneously detect the temperature of the heating element and control the energy to be applied on the basis of the temperature data detected. However, it is difficult to make such an ideal temperature sensor in terms of the structure of the thermal head.

On one hand, in facsimile apparatuses, there has been known the system in which a density of scanning lines is switched in accordance with the object and thereby to efficiently transmit image information. For example, in apparatuses based on the international standards, there have been known the scanning line densities of two stages of 7.7 lines/mm called a fine mode, and 3.85 lines/mm called a standard mode. The switching of the scanning line density is performed by changing the scanning density due to the movement of a recording paper or a recording head. Therefore, if the same amount of electric power is applied to the recording head in the fine and standard modes, the density of characters or image recorded will obviously become thick in the fine mode and thin in the standard mode.

In addition, facsimile apparatuses have a feature that the period when the image data of one line is derived (hereinafter, this period is referred to as a recording period) differs in dependence on the reading speed of the apparatus on the distant side, transmission mode such as G2, G3, or the like which is used, various data processing times for a half tone image process and the like, compression processing time, and the like, respectively. Therefore, the heat regenerative amount of the recording head varies in dependence on the recording period, so that there occurs a problem that the constant recording density is not obtained, depending on the transmission mode, image processing method, or the like.

The foregoing problems are the common problems in thermal recording apparatuses which are used in equipment having a possibility that the recording density or recording period of the input data varies as well as the facsimile apparatuses.

SUMMARY OF THE INVENTION

It is an object of the present invention to provide an image recording apparatus which can perform the optimum recording in accordance with various recording modes in consideration of the drawbacks of the conventional technologies as mentioned above.

Another object of the invention is to provide an image recording apparatus which can keep a beautiful recorded image as a visual image and also can improve a resolution thereof irrespective of the kinds of images or operating modes.

Still another object of the invention is to provide a thermal recording apparatus which can always record characters, image, or the like of a constant density even when the recording period of the input data varies.

Still another object of the invention is to provide a recording apparatus for decoding and recording a coded image signal in which energy which is supplied to recording means is variably controlled in accordance with a variation in recording period due to a difference of the decoding time.

The above and other objects and features of the present invention will become apparent from the following detailed description and the appended claims with reference to the accompanying drawings.

BRIEF DESCRIPTION OF THE DRAWINGS

FIG. 4, consisting of FIGS. 4A and 4B, is a diagram showing a control procedure of a CPU;

DETAILED DESCRIPTION OF THE PREFERRED EMBODIMENTS

FIGS. 1 to 4 show the first embodiment of the present invention. This embodiment mainly relates to a facsimile communicating apparatus and explanation will be made hereinbelow with respect to the portion regarding the control of an energy which is applied to a thermal head in order to avoid complexity of explanation. In addition, this embodiment is intended to perform not only the control by way of the temperature but also the control of the energy which is applied to the thermal head in accordance with the kind of image to be reproduced or with the operating condition of the apparatus. This energy control is performed by the method whereby a pulse width of a write strobe signal which is applied to the thermal head is controlled.

Figure 1:
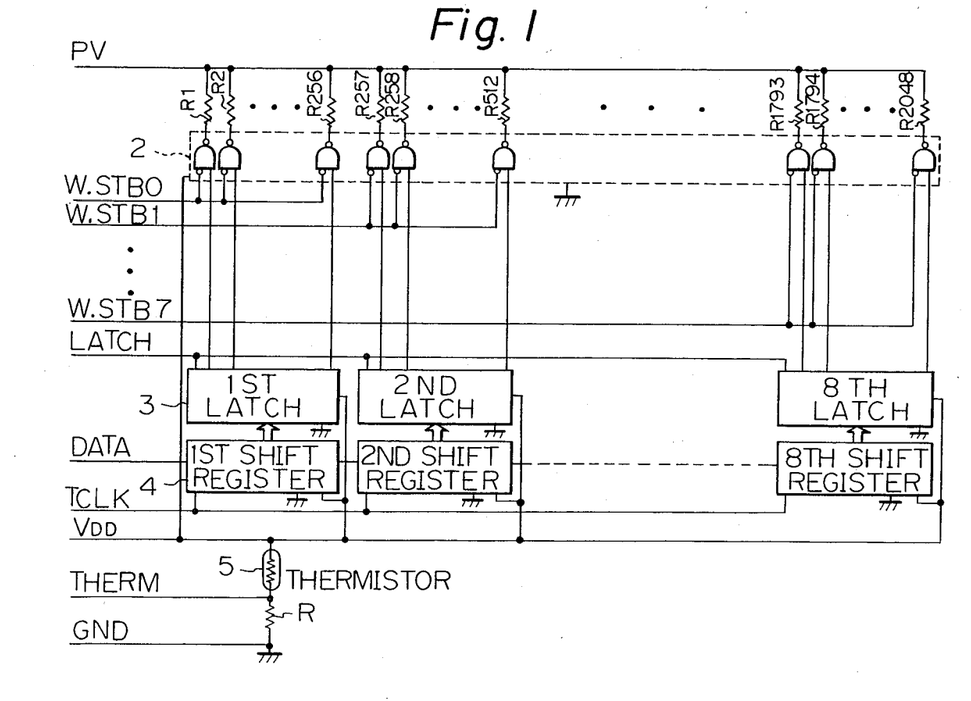
FIG. 1 is a diagram showing an arrangement of a thermal head.

FIG. 1 is an internal connection diagram of the thermal head, in which a total of 2048 heating resistors R1 to R2048 are provided. These resistors are evaporation deposited on a substrate such as alumina or the like so as to be adjacent to one another. The ohmic heat is generated by allowing a current to flow through those heating resistors. NAND gates 2 are connected to the resistors R1 to R2048, respectively. By setting a voltage of either one of W.STB (write strobe signal line) 0 to W.STB 7 as one input, to "0" (hereinafter, the high and low voltages are represented by "1" and "0", respectively), an output of this W.STB becomes "1" when the other data input line is "0" or becomes "0" when the other data input line is "1". In this manner, only the heating resistors connected to the outputs of "0" generate heat.

On the other hand, image data is inputted in series to a plurality of shift registers 4. Each shift register is constituted by 256 flip-flops and a serial output of the shift register of each block becomes an input of the next stage as shown in the diagram. Therefore, the shift registers of total eight blocks constitute the shift register of 2048 bits of total 2048 serial inputs and parallel outputs. The image data from a DATA line is sequentially transferred from the left to the right in the shift registers of eight blocks.

After completion of the transfer of 2048 serial data, the voltages of "0" and "1" representative of white and black are outputted from the parallel outputs of the shift registers of eight blocks, respectively. These voltages are latched in a plurality of latch circuits 3 by inputting a latch signal to each latch circuit 3 from a LATCH input line. The input of each latch circuit 3 corresponds to the output line of the each shift register 4 in a one-to-one correspondence manner. The output line of each latch circuit 3 is connected to the other input of each NAND gate 2.

Therefore, when the latch signal is inputted to the latch circuits 3 after completion of the serial transfer of the image data to the 2048-bit shift register, if the second parallel output line of the first shift register 4 is "1", the second output line of the first latch circuit 3 also becomes "1". Assuming that the W.STB 0 is "0" in this case, the output of the second NAND gate 2 becomes "0". When a certain voltage is applied as a recording voltage PV, a current flows through the resistor R2 and the heat is generated. Thus, a black point is recorded at the second bit of a thermal recording paper. When the parallel output lines of the shift registers are "0", the output lines of the latch circuits corresponding thereto also become "0". Therefore, even if the write strobe signal lines are set to "0", the output lines of the NAND gates 2 are still "1", so that no current flows through the heating resistors and nothing is recorded on the thermal recording paper.

The image data transferred to the shift registers 4 is latched in the latch circuits 3 in accordance with the above-mentioned processes. Then, by setting the write strobe signal lines to "0" one by one or by a plurality of number of lines at a time, the data of one line is recorded.

A thermistor 5 is attached to a proper position adapted to easily detect a temperature of the substrate of the thermal head or the heating element. However, the thermistor 5 has a characteristic such that its resistance value varies depending on the temperature, so that the voltage across a resistor R changes in dependence on the temperature. Therefore, by measuring the voltage value across the resistor R, the temperature of the substrate of the thermal head or of the heating element can be known.

A TCLK signal line is a signal line for a transfer clock to transfer the data to the shift resisters 4.

Figure 2:
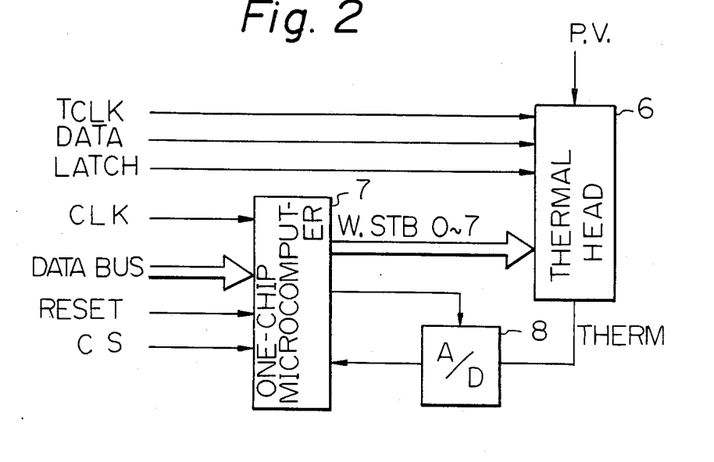
FIG. 2 is a diagram showing the main part of an electrical circuit of a recording apparatus.
Figure 4A:
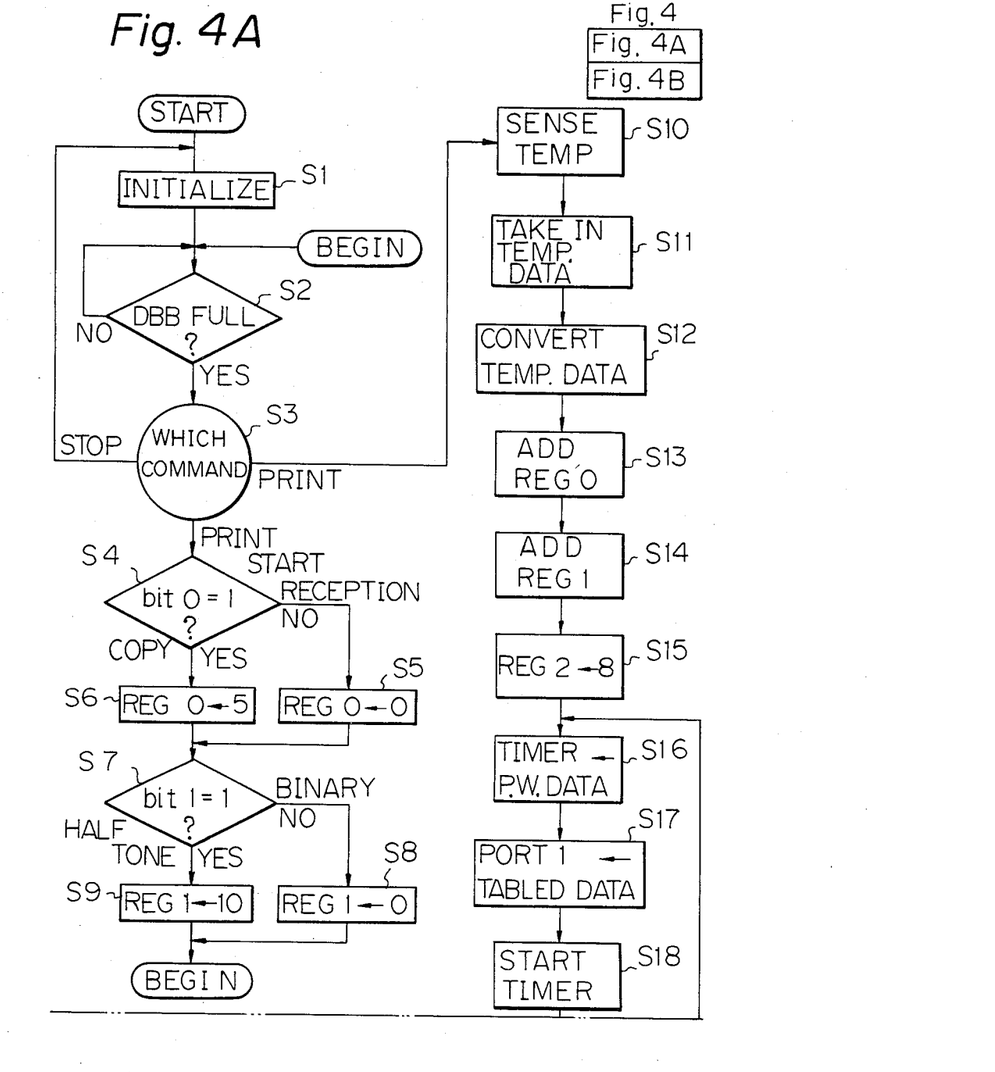
Figure 4B:
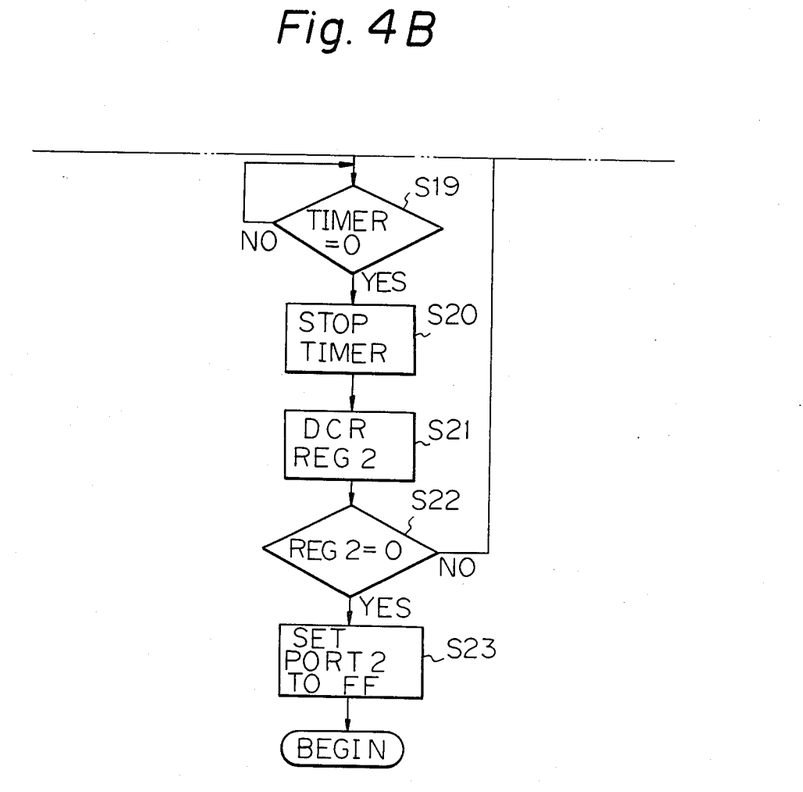

FIG. 2 is a block diagram of a circuit to control the thermal head mentioned above. Reference numeral 6 denotes a thermal head and 7 is a one-chip microcomputer. In this embodiment, explanation will be made with respect to an example whereby a one-chip CPU for I/O control, model 8041, made by Intel Co. Ltd. which is generally commercially available is used. This microcomputer 8041 has a CPU, a RAM, a ROM, eight registers and an accumulator. This microcomputer 7 is hereinafter abbreviated as MC 7. Numeral 8 denotes an A/D (analog/digital) converter. The MC 7 executes the control according to such a procedure as shown in FIG. 4 stored in the ROM provided in the MC 7.

The arrangement shown in FIG. 2 will now be described. To record the image data of one line on the thermal recording paper, this image data is serially inputted to the thermal head 6 through the DATA line synchronously with a clock on the TCLK line by a main or slave CPU (not shown). After the data of one line (2048 bits) has completely been inputted, a latch signal from the main or slave CPU (not shown) is supplied to the thermal head 6 through the LATCH line, thereby allowing the input image data to be latched into the thermal head 6. The CPU (not shown) gives a print command to the MC 7 through the data bus line. In response to this print command, the MC 7 controls the A/D converter 8 and reads an output voltage THERM of the thermistor 5 in the thermal head 6 and sequentially sets the write strobe signal lines W.STB 0 to 7 connected to a port of the MC 7 to "0" by the pulse width based on the result of the output voltage THERM. Then, the recording of one line is finished. In FIG. 2, a clock signal CLK to make the MC 7 operative, a reset signal RESET upon starting, and a chip selecting signal CS which is used to transmit the data from the main or slave CPU (not shown) to the MC 7 are inputted to the MC 7, respectively.

The control procedure of the MC 7 will then be described. The MC 7 receives commands from the CPU (not shown) and performs the operation in response to these commands. In this example, three kinds of commands are considered, namely:

(i) Print start command.
(ii) Print command.
(iii) Stop command.

Figure 3A:
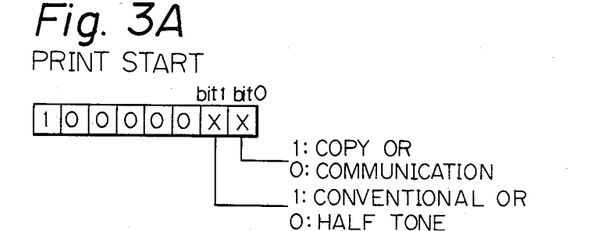
FIGS. 3A to 3C are diagrams showing bit arrangements of commands.
Figure 3B:
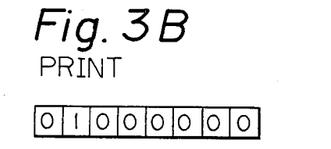
Figure 3C:
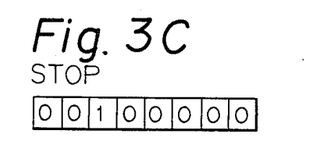

The bit patterns of these commands are as shown in FIGS. 3A to 3C. As shown in FIG. 3A, special meanings are provided for the first bit 0 and the second bit 1 which are counted from the LSB of the print start command (hereinafter, the bits are counted from the LSB). Namely, the first bit 0 is the discriminating bit to discriminate whether the operating mode is the copy mode or the reception mode (this bit is "1" in the copy mode). The second bit 1 is the discriminating bit to discriminate whether an image is an ordinary binary image or a half tone image (this bit is "1" in the case of a binary image). Those three kinds of commands mainly have the following tasks. Practically speaking, the print start command sets the resisters which are designated on the basis of the content and prepares for recording. For the print command, a signal is outputted to the write strobe signal lines while controlling the pulse widths of the write strobes on the basis of the contents of the registers set by the print start command and of the temperature data detected by the thermistor, thereby recording the data of one line. For the stop command, the operation is stopped and the apparatus is returned to the initial state.

The operation of the MC 7 when it has received those commands having the tasks as mentioned above will then be described with reference to FIG. 4. When the power supply of the MC 7 is turned on, in step S1, a reset signal of a constant time is supplied to the MC 7 from the CPU (not shown) or by other means and thereafter this reset signal is released, so that the MC 7 starts the operation from the address 0 and sets each register to 0 in accordance with the INITIALIZE routine and sets the output port to output the write strobe pulses W.STB 0 to 7 to FF (11111111), thereby inhibiting the generation of the strobe pulses. In the next step S2, a check is made to see if data exists or not in a data bus buffer DBB to store the commands from the CPU (not shown) and the apparatus waits for a command. When a command is inputted, a check is made to determine which command has been inputted in step S3 and the processing routine corresponding to this command is started. This discrimination of step S3 is performed by checking the position of high order three bits of the command bits at which "1" is set. Now, assuming that the print start command has been inputted, the program control is advanced to the PRINT START ROUTINE and step S4 follows. A check is made in step S4 to see if the first bit 0 of the command bits is "1" or not. If it is "0", namely, in the case of the reception mode, step S5 follows and the REG 0 (register 0) provided in the MC 7 is set to "0". When the bit 0 is "0", namely, in the case of the copy mode, step S6 follows and the REG 0 is set to a proper number (in this case, 5 is set).

In the next step S7, a check is made to see if the second bit 1 of the command bits is "1" or not, in a manner similar to the above. If it is "0", namely, in the case of an ordinary binary image (which is obtained from a predetermined threshold value), step S8 follows and the REG 1 provided in the MC 7 is set to "0". If it is "1", namely, in the case of a half-tone image, step S9 follows and the REG 1 is set to a proper number (in this case, 10 is set) and the apparatus waits for the next command and the processing routine is returned to the routine of step S2.

When the print command has been inputted in step S3, the control routine advances to the PRINT ROUTINE and step S10 follows. A conversion start signal is supplied to the A/D converter to start the measurement of the temperature in step S10 (SENSE TEMP). The converted data is taken in through the port of the MC 7 in step S11 (TAKE IN TEMP. DATA). In the next step S12, the temperature data is converted to the form of the pulse width data which is convenient for the pulse width control (CONVERT TO P.W. DATA). In this case, if a table in which the temperature data and the data for the pulse width control have the one-to-one correspondence relation is prepared, for example, in the ROM in the MC 7 and the above-mentioned conversion is performed on the basis of such a ROM table, this conversion can be easily executed for a short time. In steps S13 and S14, the contents of the REG 0 and REG 1 set by the print start command routine are added to the pulse width data (P.W. DATA) converted to narrow the pulse width. In the case where the recording mode is the reception mode of communication (COMMUNICATION) and the image to be printed is in the half tone mode due to a dither method, the REG 0 and REG 1 have been set to "0"; thus, the pulse width data (P.W. DATA) is not changed but becomes the original value. In the other cases, since the REG 0 or REG 1 is not set to a value other than "0", the pulse width data (P.W. DATA) is increased by only the amount as many as that value. The REG 2 is then set to "8" in step S15. The P.W. DATA is inputted through an accumulator to a timer provided in the MC 7 in step S16 (TIMER←P.W. DATA). Thereafter, the tabled data is set into the port of the MC 7 in step S17 (PORT 1← TABLED DATA). The tabled data denotes the data in which the numeric values of the bit patterns which become zero in accordance with the sequence from the LSB in the eight-bit data constituting the print command W.STB 0 to 7 are written. These numeric values are sequentially taken into the accumulator and set the port as will be explained hereinafter.

In other words, FE (11111110) in the eight-bit data is first set to port 1 and the W.STB 0 is set to "0". In the next step S18, the timer is started (START TIMER), so that the content of the register in the timer is increased at a certain time interval. Subsequently, a check is made in step S19 to see if the content of the register in the timer has overflowed and has become zero or not and the apparatus enters the routine to wait until it becomes zero. When it becomes zero, the timer is stopped in step S20. Namely, the W.STB 0 is set to "0" for only the period of time set into the timer and the heating resistors R1 to R25 are driven. In step S21, the content of the REG 2 is decreased by only "1" (DCR REG 2). A check is then made in step S22 to see if the content of the REG 2 is zero or not. If NO, the processing routine is returned to step S16 and the P.W. DATA is again set to the timer. In the next steps S17 to S21, the next FD (11111101) in the 8-bit data is set into the port and the timer is started. When the register in the timer becomes zero, the timer is stopped and the content of the REG 2 is decreased by only "1". Thereafter the values in the 8-bit data which are set into the port are changed to the FB (11111011) and F7 (11110111) and the similar operation is performed until they become the last values 7F (01111111). Thus, the write strobe (W.STB) signals 0 to 7 connected to the port sequentially become "0" for every constant period of time corresponding to the mode, so that the data is recorded on the thermal recording paper. In this loop, when the last 7F in the 8-bit data is finally set to the port, the processing routine advances to step S23 since the REG 2 is "0" in step S22 (the last step of the loop). In step S23, the port is set to FF (11111111) and the processing routine is returned to step S2 to wait for the next command. When the timer is started in the routine of step S19, the content of the register in the timer is increased from the set value for every constant time (80 μsec in the case where the MC 7 is operated by a clock (CLK) of 6 MHz), so that the content of the timer register promptly becomes zero as the first set value is large. Consequently, the period of time when the write strobe (W.STB) is set to zero is reduced. In other words, the energy which is applied to the thermal head is reduced. Therefore, the energy which is applied to the thermal head can be controlled by discriminating the content of the print start command which is sent from the CPU (not shown). For example, in the copying operation, data can be recorded by an applied energy smaller than that in the receiving operation. In the case of an ordinary binary image, data can be recorded by an applied energy smaller than that in the case of a tone image. It is possible to derive a beautiful recorded image as a visual image with an average density in accordance with the recording period irrespective of the operating condition of the apparatus and of the kind of image.

When the stop command is inputted to the MC 7, the processing routine is returned to step S1 and all initialization is performed. The detailed description of the whole operation of the apparatus was omitted for prevention of complexity in this program flow. However, when the processing routine of a command is started, a busy flag is set and the CPU (not shown) prevents data from being stored into the DBB (data bus buffer) when this busy flag is set. However, only in the case of the stop command, this busy flag is neglected and data is stored into the DBB and a check is made to see if the DBB is FULL or not in each processing routine. By constituting this flowchart such that the processing routine is returned to BEGIN if the DBB is FULL, the stop command admitting of no delay can be immediately executed.

The foregoing embodiment relates to merely one example and other various embodiments can be considered. For example, to change the amount of energy to be applied, there may be used the method whereby the recording voltage PV is controlled without changing the pulse width of the write strobe or the method whereby one line is repeatedly printed at a constant period and the number of repetitive times is changed. In addition, although the method whereby the energy which is applied to the thermal head is controlled by the CPU was described in this embodiments, the method whereby such an energy control is realized by hardware instead of the CPU, or the like, can be considered. In addition, various kinds of algorithms of the CPU control can be considered.

The second embodiment of the invention will now be described with reference to FIG. 5 and subsequent drawings.

Figure 5:
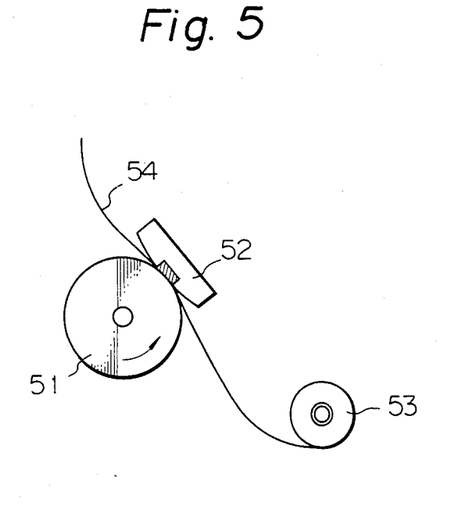
FIG. 5 is a diagrammatical view for explaining a mechanical constitution of a thermal recording apparatus of the second embodiment of the invention.

FIG. 5 shows a structure of the main mechanism portion of a thermal recording apparatus according to the second embodiment which can also commonly be used in the first embodiment. In FIG. 5, a feed roller 51 sequentially conveys a thermal paper rolled around a roll 53 by an amount of one scanning line at a time while pressing the thermal paper 54 onto a thermal head 52 having heating elements arranged in a line. In response to the conveyance of the recording paper, the heating elements of the thermal head 52 are heated in accordance with the input data, so that dots are recorded on the thermal paper 54.

Figure 6:
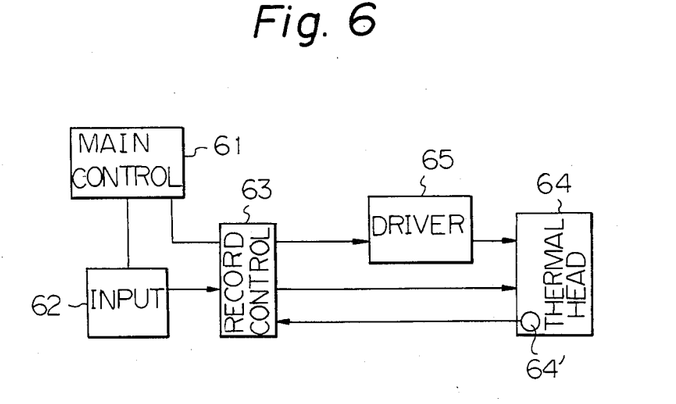
FIG. 6 is a block diagram showing an arrangement of a facsimile apparatus having the apparatus shown in FIG. 5.

On one hand, FIG. 6 is a block diagram of a control system of a facsimile apparatus having the mechanism of FIG. 5. Only the portion regarding the recording control is shown in FIG. 6 and the illustration of the other well-known constitution is omitted.

In FIG. 6, a main control unit 61 controls the whole facsimile apparatus and is constituted by well-known microcomputer, memory devices, and the like. The main control unit 61 performs the decoding of the received code image data, coding of the transmission data, and the like. The main control unit 61 also controls an image reading unit, a communication control unit, a scan display unit, and the like (which are all not shown). An input unit 62 is used to read and record an original image by a reading unit. The image data received from the reading unit in what is called a copy mode or from the communication control unit in the image reception mode is inputted to the input unit 62. The code image data inputted is decoded by the control of the main control unit 61 and transmitted to a record control unit 63 and converted to the image data having such a format that can directly drive a thermal head 64. The timing of the data converted by the record control unit 63 is controlled by the main control unit 61 in consideration of the other processes and thereafter it is transmitted to the thermal head 64 through a driver 65. In this case, the image data is converted by the driver 65 to such voltage level and pulse width that can directly drive the thermal head 64.

The thermal head 64 is substantially the same as the thermal head 52 shown in FIG. 5 except that a thermistor 64' is attached to a part of the thermal head 64 and a temperature of the thermal head 64 is detected by the thermistor 64' and the detection signal is fed back to the record control unit 63. The record control unit 63 determines the driving energy of the thermal head 64 which is applied from the driver 65 on the basis of this temperature detection data.

The driving energy is controlled by adjusting a driving voltage, a current, or a driving pulse width. However, in the following description, it is assumed that the driving energy is controlled by adjusting the driving pulse width. The driving pulse width can be adjusted by the record control unit 63 in accordance with the temperature detection data of the thermistor 64' and under the control of the main control unit 61. Since the above-mentioned constitution of the hardware is similar to the conventional one, the conventional constitution can be used as it is.

In this embodiment, it is assumed that the driving pulse width is controlled by the main control unit 61 in accordance with the data input period, namely, recording period for the input unit 62 and with the scanning line density.

Figure 7:
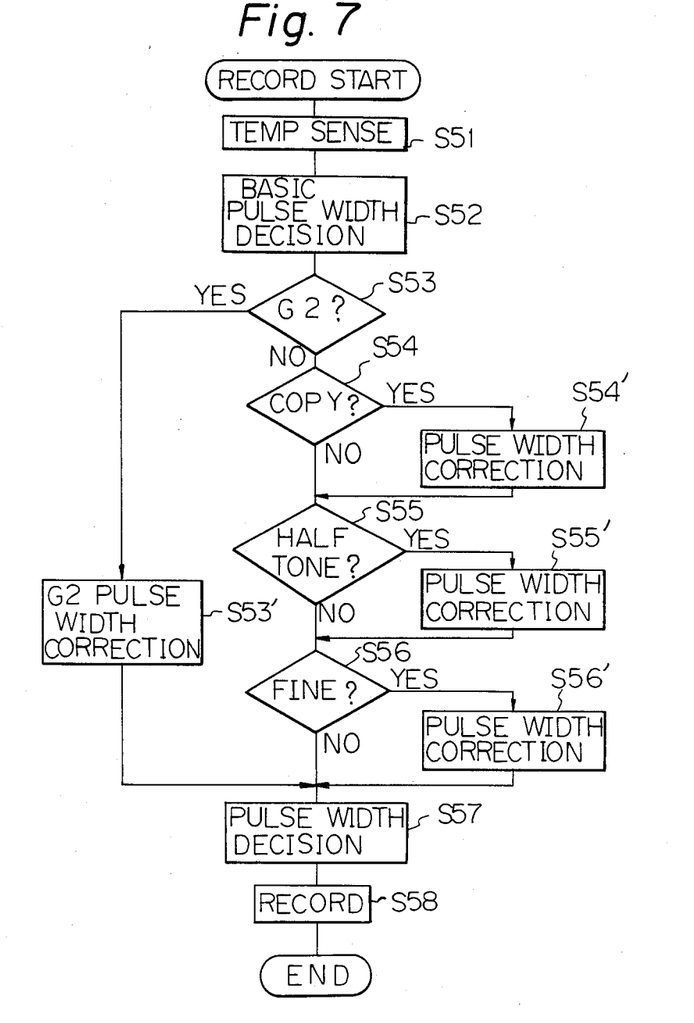
FIG. 7 is a flowchart showing a processing procedure of a main control unit in FIG. 6.

FIG. 7 shows an example of a recording control routine of the main control unit 61. In this routine, as factors which can change the recording period, the copying operation, half tone image process, and scanning line density changing process of the fine (high resolution) mode are considered and the recording pulse width is controlled in dependence on whether or not these processes are performed. In addition, in this example, a facsimile procedure in the G3 mode is mainly considered and the controls corresponding to various processes which are executed in the G3 and standard (standard resolution) modes are shown.

In the recording routine, the main control unit 61 first detects the temperature of the thermal head 64 by the thermistor 64' in step S51 in FIG. 7. In the next step S52, the basis pulse width which is applied to the thermal head 64 is determined in accordance with the temperature of the thermal head 64 detected, namely, heat regenerative amount.

Subsequently, a check is made in step S53 to see if the communication mode is G2 or not. If YES, the pulse width is corrected in accordance with the G2 mode in step S53'. Since the recording period in the G2 mode is longer than that in the G3 mode, the recording pulse width is set to be longer in consideration of the reduction of the temperature of the thermal head.

If NO in step S53, namely, when the apparatus is set into the G3 mode, a check is made to see if the copying operation is carried out or not in step S54. In this discrimination, it is determined whether the image data read by the reading unit is recorded as it is or not, namely, whether so-called the copying operation is performed or not by checking the operation states of switches or the like of the operation unit, or the like. If the copying operation is not performed, step S55 follows. If the copying operation is performed, step S54' follows and the pulse width is corrected in accordance with the copying operation and then step S55 follows.

In the case of the copying operation, the image data read is recorded without being subjected to a compressing process or the like. Therefore, the decoding time is unnecessary and the recording period is reduced and the driving pulse width is corrected such that it becomes short in step S54'.

In the next step S55, a check is made to see if the half tone image process is performed or not. In this step, it is decided whether the process to record the image received or read as a half tone image is executed or not by checking the operation states of the switches or the like of the operation unit or by checking the state of the communication control unit, or the like. If NO in step S55, step S56 follows. If YES, step S55' follows and the pulse width is corrected in accordance with the half tone image process and then step S56 follows.

In the case of the half tone image process, the decoding time of the data is needed and the recording period becomes long, so that the driving pulse width is corrected such that it becomes long in step S55'.

A check is made in the next step S56 to see if the recording in the fine mode is executed or not. In this step, it is decided whether or not the recording data is recorded in the fine mode at the recording density which is twice as large as that in the standard mode by checking the operation states of the switches or the like of the operation unit or by checking the state of the communication control unit, or the like. When the recording in the fine mode is not carried out, it is determined that the recording is performed in the standard mode and step S57 follows. If YES in step S56, step S56' follows and the pulse width is corrected in accordance with the fine mode and then step S57 follows.

Since the density in the fine mode is thicker than that in the standard mode as mentioned in the explanation of the conventional example, the driving pulse width is corrected such that it becomes short in step S56' in consideration of that point.

In step S57, the final driving pulse width for the thermal head 64 is determined on the basis of the respective pulse width corrections performed in steps S53' to S56'. Thereafter, the image data is sequentially sent to the thermal head 64 on a line by line basis in step S58 and the thermal recording operation is executed on the basis of the input data.

The fine control operation may be executed in a manner similar to that shown in the first embodiment.

As described above, characters, image, or the like can be recorded at a constant density even in a recording mode having any recording density and recording period. Although the driving energy to the thermal head was controlled due to the pulse width control in the above description, it will be obviously understood that the driving energy can be also controlled by controlling an applied voltage, a current, the number of pulses, the number of driving times, or the like.

In addition, although three factors copying operation, half tone process, and fine mode, were shown as examples of the factors which can change the recording period, the driving energy can be also controlled by detecting the recording mode which can change the recording period, if such a recording mode exists, in the case of a hard copy of the content of the image memory or in the cases where the MH codes were received and where the MR codes were received even in the G3 mode, or the like.

Further, although the example whereby the thermal recording paper is used was described, the present invention can be applied to every apparatus comprising a printer using thermal recording means including a thermal transfer copying system or an ink jet recording system which discharges liquid droplets using heating elements.

The thermal head is not limited to the thermal head for the single or double printing of full-multi type, but the invention can be also applied to every thermal head including the system in which data is recorded by reciprocatingly scanning the head unit consisting of a plurality of thermal heads.

Although the embodiments regarding the facsimile apparatus has been shown above, the foregoing technology is not limited to the facsimile apparatus but can be applied to every thermal recording apparatus in which the recording density and recording period can be changed.

As will be obvious from the above description, according to the present invention, in the thermal recording apparatus in which the heating elements are sequentially heated in accordance with the input data and image data is recorded for every scanning line, there is adopted the constitution provided with means for controlling the energy which is applied to the heating elements in accordance with the recording density and recording period relative to the data input period. Therefore, it is possible to provide an excellent thermal recording apparatus which can record characters, image, or the like at a constant density even in the recording mode having any recording density and recording period.

The present invention is not limited to the foregoing embodiments but many modifications and variations are possible within the spirit and scope of the appended claims of the invention.

What is claimed is:

1. An image recording apparatus comprising: input means for inputting image data; discriminating means for determining for every page of the image data, a kind of recording mode of said recording apparatus; image recording means for reproducing the image data inputted to said input means; and control means for variably controlling an energy which is supplied to said image recording means in order to make constant a recording density of said image recording means in accordance with the kind of recording mode.

2. An image recording apparatus according to claim 1, wherein said image recording means is a thermal head.

3. An image recording apparatus according to claim 2, wherein said control means variably controls a supply time of an electric power which is supplied to said thermal head.

4. An image recording apparatus according to claim 2, wherein said thermal head performs the recording in contact relation with a thermal recording paper.

5. An image recording apparatus according to claim 1, wherein said discriminating means discriminates whether the recording mode is a half tone image reproduction mode or a simple binary image reproduction mode.

6. An image recording apparatus according to claim 5, wherein said control means increases the energy which is supplied to said image recording means as compared with the simple binary image when the input recording mode is the half tone image reproduction mode.

7. An image recording apparatus according to claim 5, wherein said half tone image mode carries out a half tone image by means of a dither method.

8. An image recording apparatus according to claim 1, wherein said discriminating means determines a resolution of the recording image.

9. An image recording apparatus according to claim 8, wherein when said resolution is high, said control means reduces said supply energy as compared with that when the resolution is low.

10. An image recording apparatus according to claim 8, wherein said discriminating means discriminates whether the recording mode is for recording a copy image or a received image, and in the case of the copy image, said control means reduces said supply energy as compared with that in the case of the received image.

11. An image recording apparatus, comprising:
recording means having a plurality of thermal heads for recording an image signal;
discriminating means for discriminating a kind of recording mode of said recording apparatus;
detecting means for detecting a temperature of said thermal head; and
control means for controlling a quantity of energy to be supplied into said thermal head in response to a discriminating result of said discriminating means and a detection output from said detecting means.

12. An image recording apparatus according to claim 11, wherein said control means variably controls a supply time of an electric power which is supplied to said thermal head.

13. An image recording apparatus according to claim 11, wherein said thermal head performs the recording in contact relation with a thermal recording paper.

14. An image recording apparatus according to claim 11, wherein said control means controls the energy on the basis of whether the recording mode is a half tone image reproduction mode or a simple binary image reproduction mode.

15. An image recording apparatus according to claim 14, wherein said half tone image reproduction mode carries out a half tone image by means of a dither method.

16. An image recording apparatus according to claim 11, wherein said control means controls the energy in accordance with a resolution of the recording image.

17. An image recording apparatus according to claim 11, wherein said control means controls the energy due to whether the recording mode carries out a copy image reproduction mode or a received image reproduction mode.

* * * * *

UNITED STATES PATENT AND TRADEMARK OFFICE
CERTIFICATE OF CORRECTION

PATENT NO. : 4,737,860
DATED : April 12, 1988
INVENTOR(S) : TAKESHI ONO, ET AL.

It is certified that error appears in the above-identified patent and that said Letters Patent is hereby corrected as shown below:

AT [56] IN THE REFERENCES

U.S. Patent Documents, "Nozuchi et al." should read --Noguchi et al.--.

COLUMN 1

Line 26, "copying" should read --the copying--.
    Line 29, "(Run." should read --(Run--.
    Line 62, "7.7 lines/mm" should read --7.7 lines/mm,--.
    Line 63, "lines/mm" should read --lines/mm,--.

COLUMN 3

Line 27, "W.STB 7" should read --W.STB 7,--.

COLUMN 4

Line 36, "The arrangement" should read --The operation of the arrangement--.

COLUMN 5

Line 14, "resisters" should read --registers--.

COLUMN 9

Line 18, "so-called the" should read --the so-called--.

UNITED STATES PATENT AND TRADEMARK OFFICE
CERTIFICATE OF CORRECTION

PATENT NO. : 4,737,860

DATED : April 12, 1988

INVENTOR(S) : TAKESHI ONO, ET AL.

It is certified that error appears in the above-identified patent and that said Letters Patent is hereby corrected as shown below:

COLUMN 10

Line 14, "copying" should read --(copying--.
    Line 15, "mode," should read --mode)--.

Signed and Sealed this

Twenty-fifth Day of October, 1988

Attest:

DONALD J. QUIGG

Attesting Officer      Commissioner of Patents and Trademarks